US012105358B2

(12) United States Patent
Yang et al.

(10) Patent No.: US 12,105,358 B2
(45) Date of Patent: Oct. 1, 2024

(54) INTELLIGENT HEAD-MOUNTED APPARATUS

(71) Applicant: GOERTEK INC., Shandong (CN)

(72) Inventors: Xinfeng Yang, Shandong (CN); Chengxiang Zhai, Shandong (CN); Miaomiao Wang, Shandong (CN)

(73) Assignee: GOERTEK INC., Weifang (CN)

( * ) Notice: Subject to any disclaimer, the term of this patent is extended or adjusted under 35 U.S.C. 154(b) by 224 days.

(21) Appl. No.: 17/773,015

(22) PCT Filed: Oct. 30, 2020

(86) PCT No.: PCT/CN2020/125236
§ 371 (c)(1),
(2) Date: Apr. 28, 2022

(87) PCT Pub. No.: WO2021/083326
PCT Pub. Date: May 6, 2021

(65) Prior Publication Data
US 2022/0390770 A1 Dec. 8, 2022

(30) Foreign Application Priority Data
Nov. 1, 2019 (CN) .......................... 201911059739.9

(51) Int. Cl.
*H04R 25/00* (2006.01)
*G02C 11/00* (2006.01)
*H04R 1/10* (2006.01)

(52) U.S. Cl.
CPC ............. *G02C 11/10* (2013.01); *H04R 1/105* (2013.01)

(58) Field of Classification Search
CPC ........ H04R 1/105; H04R 1/10; H04R 1/1058; H04R 1/28; H04R 1/2846; H04R 5/0335; G02C 11/10; G02C 11/06

USPC ......................................................... 381/381
See application file for complete search history.

(56) References Cited

U.S. PATENT DOCUMENTS

2006/0056650 A1    3/2006  Hofmann et al.

FOREIGN PATENT DOCUMENTS

| CN | 204681561 U | 9/2015 |
|---|---|---|
| CN | 109862496 A | 6/2019 |
| CN | 110036652 A | 7/2019 |
| CN | 110830867 A | 2/2020 |
| WO | 2013030437 A1 | 3/2013 |

OTHER PUBLICATIONS

International Search Report from International Application No. PCT/CN2020/125236 mailed Jan. 27, 2021.

*Primary Examiner* — Phylesha Dabney
(74) *Attorney, Agent, or Firm* — Shih IP Law Group, PLLC

(57) ABSTRACT

Disclosed is an intelligent head-mounted apparatus, comprising: a lens; a leg coupled to the lens and provided with a cavity therein; a sound generation device provided in the cavity and dividing the cavity into front and rear sound cavities; a sound outlet hole provided on the leg and in communication with the front sound cavity; main and auxiliary sound leakage holes provided on the leg and in communication with the rear sound cavity, positions of the sound outlet hole, the main sound leakage hole and the auxiliary sound leakage hole are configured such that the sound outlet hole and the auxiliary sound leakage hole are located at a front side of an auricle of a wearer, the main sound leakage hole is located at a rear side of the auricle of the wearer when the wearer wears the intelligent head-mounted apparatus.

9 Claims, 4 Drawing Sheets

INTELLIGENT HEAD-MOUNTED APPARATUS

TECHNICAL FIELD

The present disclosure relates to a technical field of intelligent wear, and in particular to an intelligent head-mounted apparatus.

BACKGROUND ART

With the development of science and technology, intelligent wearable apparatus have brought great convenience to people's life. As intelligent wearable apparatus, intelligent head-mounted apparatus are becoming more and more popular. The intelligent head-mounted apparatus can be regarded as micro intelligent apparatus, which have corresponding functions of collecting, processing or displaying data. Users can install programs such as software, games etc. provided by software service providers in the intelligent head-mounted apparatus, can achieve functions of adding schedule, map navigation, interacting with friends, taking photos and videos and launching video calls with friends etc. through voice or action controlling, and can implement wireless network accessing through mobile communication network.

The coupling mode between a sound generation device on the intelligent head-mounted apparatus and the human ear is preferably an open type. Compared with the in-ear structure hermetically coupled with an earhole, the open type coupling is more convenient and comfortable to wear, and can sense the external dynamics in real time. However, the disadvantage of the open type coupling is also obvious, i.e., the sound leakage is large. On one hand, it is not conducive to the protection of personal privacy; and on the other hand, it may interfere with others.

A solution of solving the above problem in the prior art is as follows: as shown in FIG. 7, a sound leakage hole 4 is provided on a rear sound cavity of the sound generation device, and the sound leakage hole 4 and a sound outlet hole 3 of a front sound cavity are located at a front side of the wearer's auricle, and both of them form an acoustic dipole effect at a far-field position, thereby reducing the sound leakage at the far-field and protecting personal privacy. However, in this solution, while reducing the sound leakage, the sound received by the wearer is relatively reduced due to certain acoustic short circuit of sounds in the front and rear cavities, mainly in a low-frequency band.

SUMMARY

An object of the present disclosure is to provide a new technical solution of an intelligent head-mounted apparatus, which further improves the loudness of the sound received by the wearer while reducing the sound leakage.

According to a first aspect of the present disclosure, there is provided an intelligent head-mounted apparatus, comprising:

a lens; a leg coupled to the lens and provided with a cavity therein;

a sound generation device provided in the cavity and dividing the cavity into a front sound cavity and a rear sound cavity;

a sound outlet hole provided on the leg and in communication with the front sound cavity; and a main sound leakage hole and an auxiliary sound leakage hole provided on the leg and in communication with the rear sound cavity, wherein positions of the sound outlet hole, the main sound leakage hole and the auxiliary sound leakage hole are configured such that the sound outlet hole and the auxiliary sound leakage hole are located at a front side of an auricle of a wearer, and the main sound leakage hole is located at a rear side of the auricle of the wearer when the wearer wears the intelligent head-mounted apparatus.

Preferably, the main sound leakage hole on the leg is positioned such that a distance between the main sound leakage hole and an earhole of the wearer of the intelligent head-mounted apparatus is larger than a distance between the sound outlet hole and the earhole of the wearer.

Preferably, the distance between the main sound leakage hole and the earhole of the wearer is larger than the distance between the sound outlet hole and the earhole of the wearer by more than 10 mm.

Preferably, a distance between the auxiliary sound leakage hole and the earhole of the wearer is larger than the distance between the sound outlet hole and the earhole of the wearer.

Preferably, the distance between the auxiliary sound leakage hole and the earhole of the wearer is larger than the distance between the sound outlet hole and the earhole of the wearer by more than 5 mm.

Preferably, a distance between the auxiliary sound leakage hole and the sound outlet hole is smaller than a distance between the main sound leakage hole and the sound outlet hole.

Preferably, an area of the auxiliary sound leakage hole is smaller than that of the main sound leakage hole.

Preferably, the sound outlet hole is located at a bottom surface of the leg, and the main sound leakage hole is located at a top surface, the bottom surface or a side surface of the leg.

Preferably, the auxiliary sound leakage hole is located at a top surface, a bottom surface or a side surface of the leg.

Preferably, the leg comprises a fixed section and a fitting section, the fixed section is coupled to the lens, the fitting section is located at an end of the fixed section away from the lens and is bent and extended with respect to the fixed section, the sound outlet hole and the auxiliary sound leakage hole are located at the fixed section, and the main sound leakage hole is located at the fitting section.

In the intelligent head-mounted apparatus provided by the present disclosure, a main sound leakage hole and an auxiliary sound leakage hole are provided, and the positions of the sound leakage holes are newly adjusted and designed. When the wearer wears the intelligent head-mounted apparatus, the main sound leakage hole is located at the rear side of the auricle of the wearer, and the sound outlet hole and the auxiliary sound leakage hole are located at the front side of the auricle of the wearer.

For the near-field, since the main sound leakage hole is located at the rear side of the auricle, a part of the sound waves corresponding to the main sound leakage hole are transmitted to the ear of the wearer only after bypassing the auricle, the sound attenuation is relatively large, and the counteraction effect on the sound outlet hole is weakened, so that the low-frequency sensitivity is significantly improved, and the loudness of the sound received by the wearer is increased.

For the far-field, the main sound leakage hole and the sound outlet hole, the auxiliary sound leakage hole and the sound outlet hole form two pairs of acoustic dipoles for the people around the wearer, the auxiliary sound leakage hole is located at the front side of the auricle, the distance between the auxiliary sound leakage hole and the sound outlet hole may be set relatively smaller, and the rear cavity corresponding to the position of the auxiliary sound leakage hole is relatively broader, which has less obstruction to the sound waves, so that the acoustic dipole effect formed by the auxiliary sound leakage hole and the sound outlet hole is improved, thereby improving the effect of leakage reduction.

In a word, the technical solution of the present disclosure can greatly improve the low-frequency sensitivity and the leakage reduction effect of the product.

Other features and advantages of the present disclosure will become clear from the following detailed description of exemplary embodiments of the present disclosure with reference to the accompanying drawings.

BRIEF DESCRIPTION OF THE DRAWINGS

The accompanying drawings which are incorporated in and constitute a part of the specification illustrate the embodiments of the present disclosure, and are used to explain the principles of the present disclosure together with the description thereof.

Figure 1:
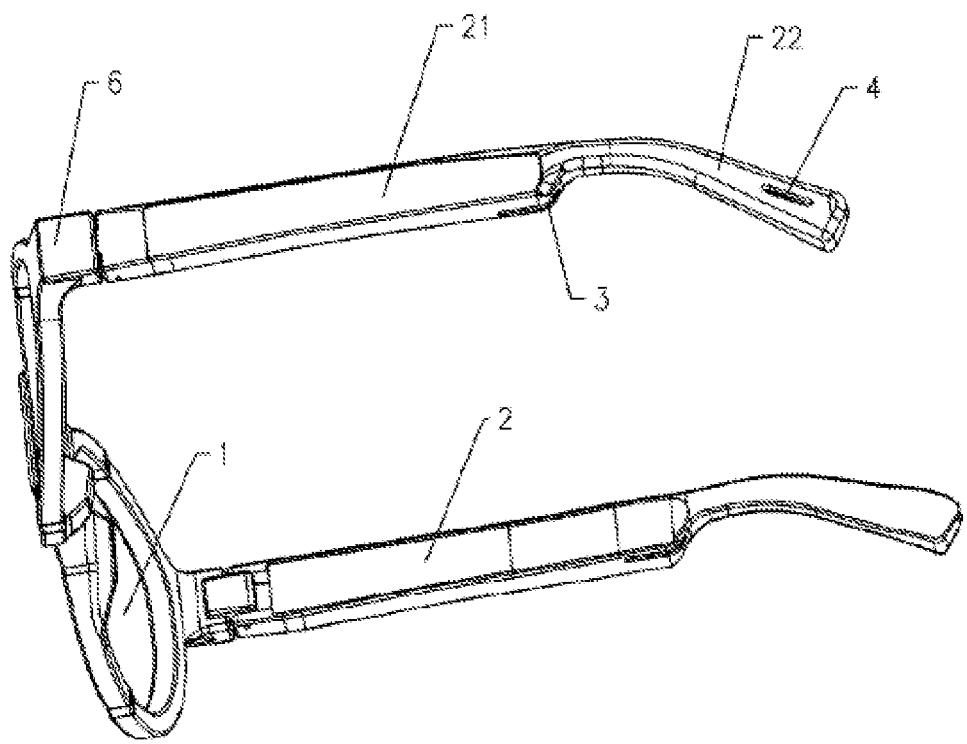
FIG. 1 is a structural schematic diagram of an intelligent head-mounted apparatus according to a first embodiment of the present disclosure.

In the drawings: 1, lens; 2, leg; 21, fixed section; 22, fitting section; 3, sound outlet hole; 4, main sound leakage hole; 5, auxiliary sound leakage hole; 7, frame.

DETAILED DESCRIPTION OF EMBODIMENTS

Various exemplary embodiments of the present disclosure will now be described in detail with reference to the accompanying drawings. It should be noted that the relative arrangements, numerical expressions and numerical values of the components and steps set forth in these embodiments do not limit the scope of the present disclosure unless otherwise specified.

The following description of at least one exemplary embodiment is in fact only illustrative and is in no way taken as any limitation on the present disclosure and the application or use thereof.

Techniques, methods and equipment known to those skilled in the art may not be discussed in detail, but in appropriate cases, the techniques, methods and equipment shall be considered as a part of the specification.

In all of the examples shown and discussed here, any specific value should be interpreted as merely illustrative and not as a limitation. Therefore, other examples of the exemplary embodiments may have different values.

It should be noted that similar numerals and letters denote similar items in the following drawings. Therefore, once an item is defined in one drawing, it does not need to be further discussed in subsequent drawings.

First Embodiment

According to an embodiment of the present disclosure, an intelligent head-mounted apparatus is provided. Referring to FIG. 1, the intelligent head-mounted apparatus comprises at least one lens 1 and at least one leg 2, the lens 1 is coupled to the leg 2, and the leg 2 is provided with a cavity therein. The intelligent head-mounted apparatus further comprises a sound generation device, which is provided in the cavity, and divides the cavity into a front sound cavity and a rear sound cavity. The leg 2 is provided with a sound outlet hole 3 and a main sound leakage hole 4, wherein the sound outlet hole 3 is in communication with the front sound cavity, and the main sound leakage hole 4 is in communication with the rear sound cavity.

The intelligent head-mounted apparatus of the present disclosure achieves the open type coupling between the sound generation device and the earhole of the wearer by providing the sound generation device in the cavity of the leg 2. Compared with the in-ear closed coupling form, the open type coupling is convenient and comfortable to wear, and has a simple structure and beautiful appearance, and the wearer can sense the external dynamics in real time, which improves the safety of the intelligent head-mounted apparatus in use.

Specifically, the sound outlet hole 3 is positioned such that there is a predetermined distance between the sound outlet hole 3 and the earhole of the wearer when the wearer wears the intelligent head-mounted apparatus, and the predetermined distance is larger than or equal to 0.5 cm. Preferably, when the user wears the intelligent head-mounted apparatus, the range of the linear distance D between the sound outlet hole 3 and the earhole is 0.5 cm to 6 cm. For example, the linear distance D between the sound outlet hole 3 and the earhole is 3 cm. The inventor found that the above predetermined distance may affect the audio loudness obtained by the user. When the range of the predetermined distance D is 2 cm to 4 cm, the audio loudness obtained by the user is moderate. In particular, in outdoor activities, when the predetermined distance is within the above distance range, the user can not only enjoy high-quality audio (i.e., the audio having moderate loudness and clear sound quality), but can also sense the external sound within a certain decibel range (for example, the whistle of the vehicle, etc.), which reduces the risk coefficient of outdoor activities for the user.

However, the disadvantage of this open type coupling is also obvious. Due to the outward diffusion of the sound source, people around the wearer may also hear the sound emitted by the sound generation device of the intelligent head-mounted apparatus. On one hand, it is not conducive to the protection of the personal privacy of the wearer, and on the other hand, it may interfere with others.

Therefore, in the present disclosure, the sound outlet hole 3 is provided at a position in communication with the front sound cavity of the sound generation device, and the main sound leakage hole 4 is provided at a position in communication with the rear sound cavity of the sound generation device. As the front sound cavity and the rear sound cavity are respectively located at two sides of a diaphragm of the sound generation device, therefore, for example, when the diaphragm vibrates to a direction of the front sound cavity, the air in the front sound cavity is compressed, and the air in the rear sound cavity is expanded. Therefore, the phase of the sound source of the front sound cavity (i.e., the phase of the sound outlet hole 3) is opposite to the phase of the sound source of the rear sound cavity (i.e., the phase of the main sound leakage hole 4), thereby forming positive and negative sound pressure phases.

For the far-field, the distance between the person around the wearer and the sound outlet hole 3 is approximate to the distance between the person and the main sound leakage hole 4, and the phases of the two sound sources (i.e., the sound outlet hole 3 and the main sound leakage hole 4) are opposite. Therefore, the acoustic dipole effect may be formed, so that the sound emitted by the two sound sources may counteract each other at the peripheral position of the wearer of the intelligent head-mounted apparatus, so as to achieve the purpose of leakage reduction.

The so-called acoustic dipole refers to two sound sources which are near to each other, they have the same vibration amplitude and opposite phases, the synthetic sound source composed of such two point sound sources is called the acoustic dipole. The intelligent head-mounted apparatus of the present disclosure makes use of the opposite phase leakage reduction principle of the acoustic dipole, to make the sounds emitted by the two sound sources (i.e., the sound outlet hole 3 and the main sound leakage hole 4) counteract each other at a distance, so as to achieve the purpose of leakage reduction. The condition that the acoustic dipole effect can be formed by the sound outlet hole 3 and the main sound leakage hole 4 is as follows: for the earhole of the person around the wearer, the distance between the sound outlet hole 3 and the main sound leakage hole 4 may be negligible, and the distances between the two sound sources (i.e., the sound outlet hole 3 and the main sound leakage hole 4) and the earhole of the person around the wearer are approximately equal. Therefore, the two sound sources with opposite phases counteract each other when reaching the earhole of the person around the wearer, so as to achieve the purpose of leakage reduction.

For the near-field, there is a relatively larger difference between the distance between the wearer and the sound outlet hole 3 and the distance between the wearer and the main sound leakage hole 4, which does not meet the condition for the acoustic dipole effect, and the degree of sound wave counteraction is small. Therefore, the wearer can hear the sound with appropriate loudness.

Figure 2:
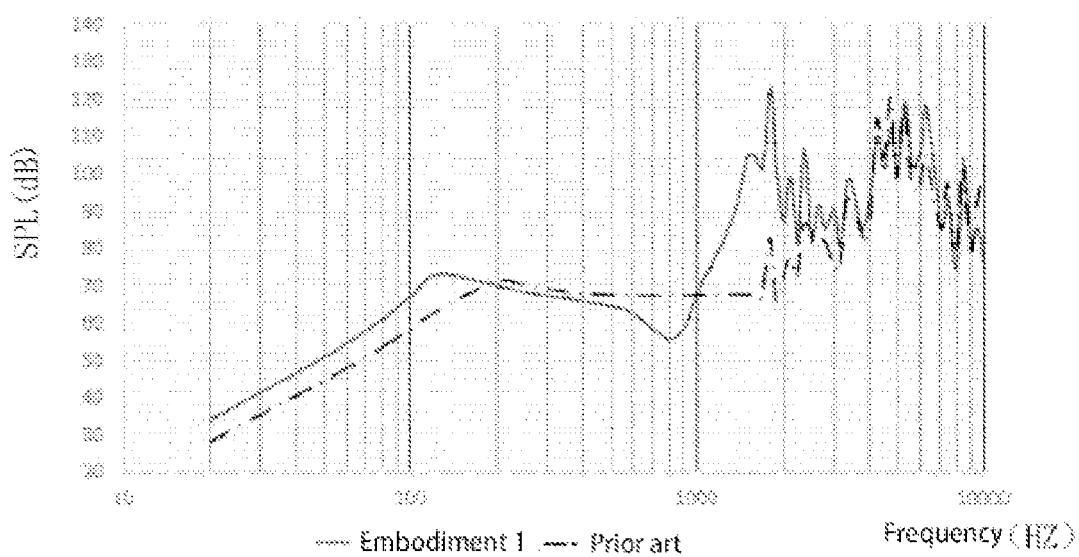
FIG. 2 is a comparison diagram of the frequency response curves received by the earhole of the wearer in the first embodiment and the prior art.

Further, the positions of the sound outlet hole 3 and the main sound leakage hole 4 are configured such that the sound outlet hole 3 is located at a front side of the auricle of the wearer, and the main sound leakage hole 4 is located at a rear side of the auricle of the wearer when the wearer wears the intelligent head-mounted apparatus. When the main sound leakage hole 4 is provided at the rear side of the auricle of the wearer, the sound waves emitted by the main sound leakage hole 4 are transmitted into the ear of the wearer only after bypassing the auricle, the sound attenuation is relatively large, and the sound wave counteraction effect on the sound outlet hole 3 is weakened, so that the low-frequency sensitivity is significantly improved, and the loudness of the sound received by the wearer is increased. Referring to FIG. 2, compared with the prior art, the low-frequency sensitivity of this embodiment is significantly improved.

Specifically, the distance between the main sound leakage hole 4 and the earhole of the wearer is larger than the distance between the sound outlet hole 3 and the earhole of the wearer. For the wearer, the anti phase sound waves of the main sound leakage hole 4 weaken the loudness of the sound received at the human ear, that is, the sound waves emitted by the main sound leakage hole 4 may partially counteract the sound waves emitted by the sound outlet hole 3, thus affecting the listening effect of the wearer. In order to reduce this weakening effect, the inventor found that the distance between the main sound leakage hole 4 and the human ear needs to be larger than the distance between the sound outlet hole 3 and the human ear.

In one embodiment, the distance between the main sound leakage hole 4 and the earhole of the wearer is defined as a first distance, the distance between the sound outlet hole 3 and the earhole of the wearer is defined as a second distance, and the first distance is larger than the second distance by more than 10 mm. The inventor found that when the difference between the above two distances is larger than 5 mm, the two sound sources (i.e., the sound outlet hole 3 and the main sound leakage hole 4) relative to the earhole of the wearer do not meet the condition for the formation of the acoustic dipole effect, so the influence on the wearer may be reduced. When the position of the main sound leakage hole 4 is provided at the rear side of the corresponding auricle, the difference between the two distances may be larger, specifically, more than 10 mm. That is, for the people around the wearer, the two sound sources (i.e., the sound outlet hole 3 and the main sound leakage hole 4) form an acoustic dipole effect to reduce the sound leakage. For the wearer, the two sound sources (i.e., the sound outlet hole 3 and the main sound leakage hole 4) cannot form the acoustic dipole effect, so as not to affect the listening effect of the wearer.

In one embodiment, referring to FIG. 1, the leg 2 comprises a fixed section 21 and a fitting section 22, the fixed section 21 is coupled to the lens 1, the fitting section 22 is located at a end of the fixed section 21 away from the lens 1, and the fitting section 22 is bent and extended with respect to the fixed section 21. The sound generation device is located in the fixed section 21. In this embodiment, the fitting section 22 is bent with respect to the fixed section 21, to more conveniently hang the fitting section 22 on the ear of the wearer and form a stable connection with the ear of the wearer.

In this embodiment, the sound outlet hole 3 is provided at a position of the fixed section 21 adjacent to the fitting section 22. Based on the working state of the intelligent head-mounted apparatus, the sound outlet hole 3 is provided at a bottom surface of the fixed section 21 facing the earhole of the wearer. Specifically, the height of the fixed section 21 in a vertical direction is larger than that of the fitting section 22, an end surface is formed at one end of the fixed section 21 adjacent to the fitting section 22, and the end surface is configured to be smoothly coupled to the fitting section 22. The sound outlet hole 3 is located at the bottom surface of the leg 2, the sound outlet hole 3 is a slot of a strip shape, and at least a part of the sound outlet hole 3 extends to the end surface, so that the sound emission direction of the sound outlet hole 3 can face the earhole of the wearer.

The main sound leakage hole 4 is specifically provided at the fitting section 22 and may be located at a top surface, a bottom surface or an outside surface of the fitting section 22. In this specific embodiment, the main sound leakage hole 4 is located at a side surface of an end of the fitting section 22 away from the fixed section 21.

In one embodiment, the intelligent head-mounted apparatus further comprises at least one frame 7, the frame 7 is configured to fix the lens 1, and the leg 2 is coupled to the frame 7. In one embodiment, the leg 2 is movably coupled to the frame 7, and the leg 2 may be folded with respect to the frame 7 for easy storage. When the leg 2 comprises the fixed section 21 and the fitting section 22, specifically, the fixed section 21 is movably coupled to the frame 7. Generally, in the intelligent head-mounted apparatus, two lenses 1 and two legs 2 are symmetrically provided, and each of the two lenses 1 are fixed by one frame 7. At this time, the sound outlet holes 3 and the main sound leakage holes 4 are symmetrically provided on the two legs 2.

Second Embodiment

This embodiment is a further improvement based on the first embodiment. The difference between the second embodiment and the first embodiment is as follows.

Figure 4:
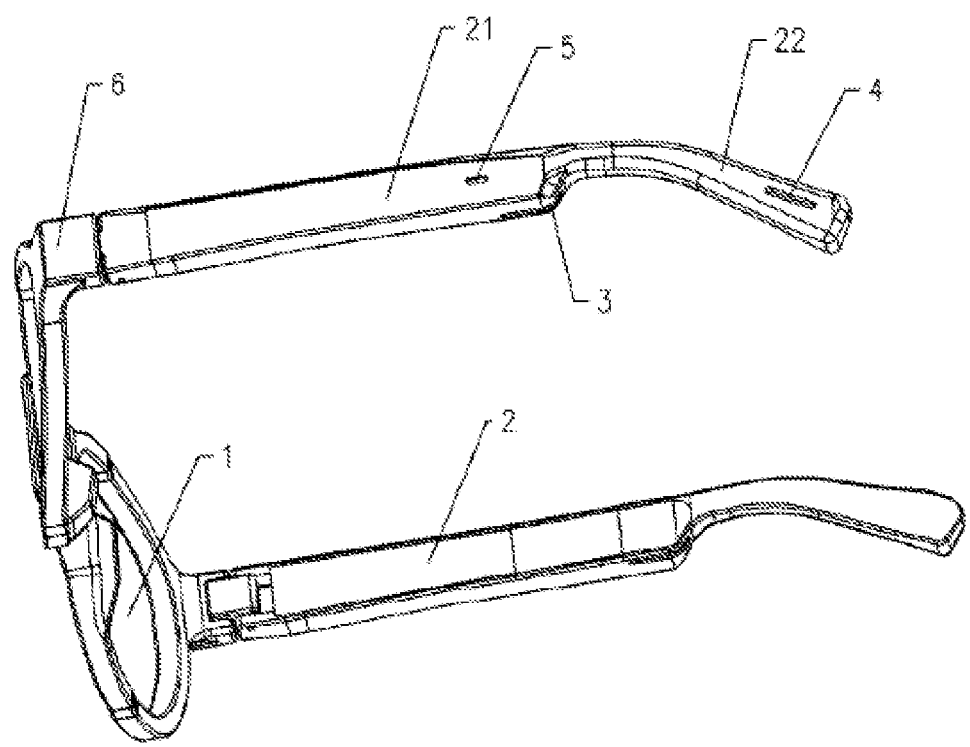
FIG. 4 is a structural schematic diagram of an intelligent head-mounted apparatus according to the second embodiment of the present disclosure.

As shown in FIG. 4, in this embodiment, the leg 2 is further provided with an auxiliary sound leakage hole 5 in communication with the rear sound cavity. The position of the auxiliary sound leakage hole 5 on the leg 2 is configured such that the auxiliary sound leakage hole 5 is located at the front side of the auricle of the wearer when the wearer wears the intelligent head-mounted apparatus. In addition, the distance between the auxiliary sound leakage hole 5 and the earhole of the wearer is larger than the distance between the sound outlet hole 3 and the earhole of the wearer.

Figure 3:
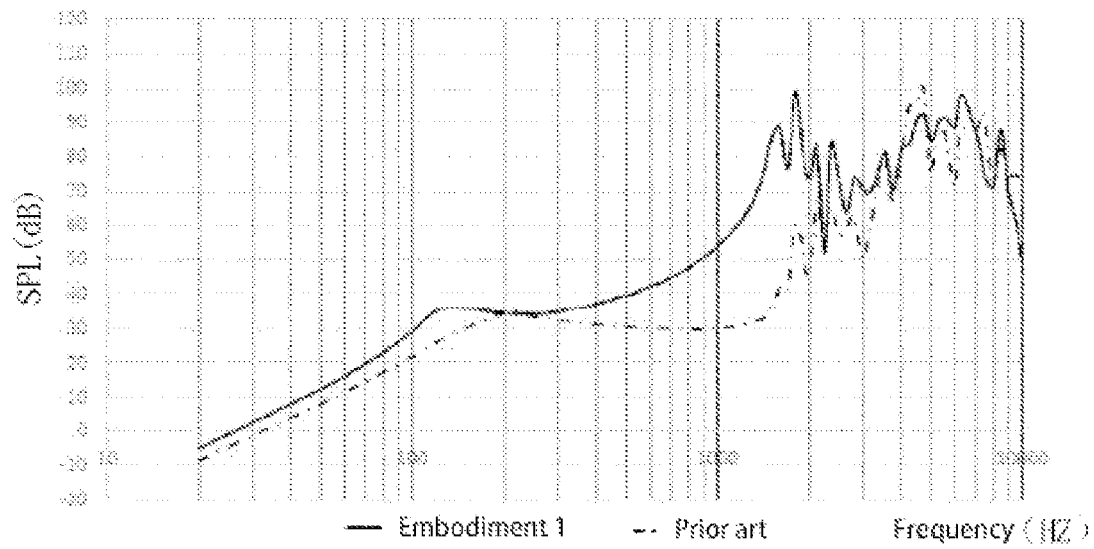
FIG. 3 is a comparison diagram of the frequency response curves at a position 30 cm away from the side of the wearer in the first embodiment and the prior art.

In the first embodiment, when only the main sound leakage hole 4 is provided, since the main sound leakage hole 4 is located at the rear side of the auricle of the wearer, the distance between the main sound leakage hole 4 and the sound outlet hole 3 is relatively larger due to the limitation of the overall structure. In addition, in the structural design of the leg 2 of the intelligent head-mounted apparatus, in order to match the shape of the auricle and for comfort consideration, a section of the fitting section 22 transiting to the rear side of the auricle is generally designed to be narrow. As a result, a cross-section of the rear cavity of the sound generation device at this position is small, the sound resistance is large, so the sound output of the main sound leakage hole 4 is affected. Referring to FIG. 3, it can be seen from the comparison with the frequency response curve of the prior art that the acoustic dipole effect of the solution of the first embodiment is weakened and the sound leakage at the far-field is slightly increased. It should be noted that the above comparison is the analysis of the comparison results between the main sound leakage hole 4 provided at the rear side of the auricle and the main sound leakage hole 4 provided at the front side of the auricle in the prior art. Compared with the solution without the sound leakage hole, the main sound leakage hole 4 provided at the rear side of the auricle can still achieve a better effect of reducing sound leakage.

In this embodiment, one auxiliary sound leakage hole 5 is added, and the auxiliary sound leakage hole 5 is located at the front side of the auricle of the wearer in the working state of the intelligent head-mounted apparatus. In the above design, a part of the sound waves in the rear sound cavity of the sound generation device propagate to the rear side of the auricle and is led out through the main sound leakage hole 4, and the other part of the sound waves propagate to the front side of the auricle and is led out through the auxiliary sound leakage hole 5. For the far-field, the main sound leakage hole 4 and the sound outlet hole 3, the auxiliary sound leakage hole 5 and the sound outlet hole 3 form two pairs of acoustic dipoles for the people around the wearer.

The main sound leakage hole 4 and the auxiliary sound leakage hole 5 act together, the main sound leakage hole 4 is located at the rear side of the auricle, a part of the sound waves corresponding to the main sound leakage hole 4 are transmitted to the ear of the wearer only after bypassing the auricle, the sound attenuation is relatively large, and the counteraction effect on the sound outlet hole 3 is weakened, so that the low-frequency sensitivity is significantly improved, and the loudness of the sound received by the wearer is increased. The auxiliary sound leakage hole 5 is located at the front side of the auricle, the distance between the auxiliary sound leakage hole 5 and the sound outlet hole 3 may be set relatively smaller, specifically, the distance between the auxiliary sound leakage hole 5 and the sound outlet hole 3 is smaller than the distance between the main sound leakage hole 4 and the sound outlet hole 3. In addition, the rear cavity corresponding to the position of the auxiliary sound leakage hole 5 is relatively broader, which has less obstruction to the sound waves, so that the acoustic dipole effect formed by the auxiliary sound leakage hole 5 and the sound outlet hole 3 is improved, thereby improving the effect of leakage reduction.

Figure 5:
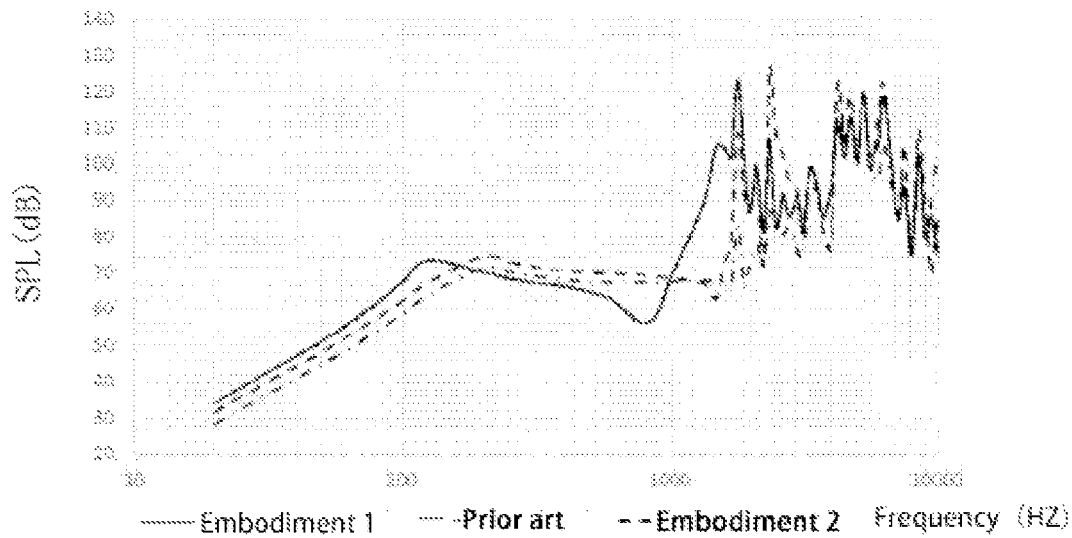
FIG. 5 is a comparison diagram of the frequency response curves received by the earhole of the wearer in the second embodiment, the first embodiment and the prior art.

Referring to FIG. 5, FIG. 5 is a comparison diagram of the frequency response curves received by the earhole of the wearer in this embodiment, the first embodiment and the prior art. It can be seen that for the sound received by the wearer, the low-frequency sensitivity of this embodiment is between the prior art and the first embodiment. Compared with the prior art, the low-frequency sensitivity of this embodiment has a better improvement effect.

Figure 6:
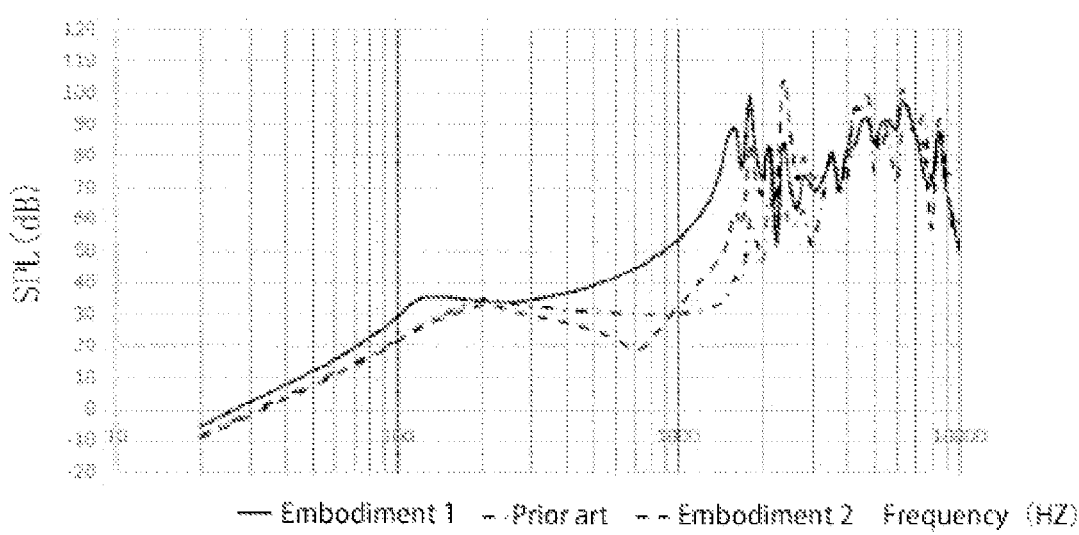
FIG. 6 is a comparison diagram of the frequency response curves at the position 30 cm away from the side of the wearer in the second embodiment, the first embodiment and the prior art.
Figure 7:
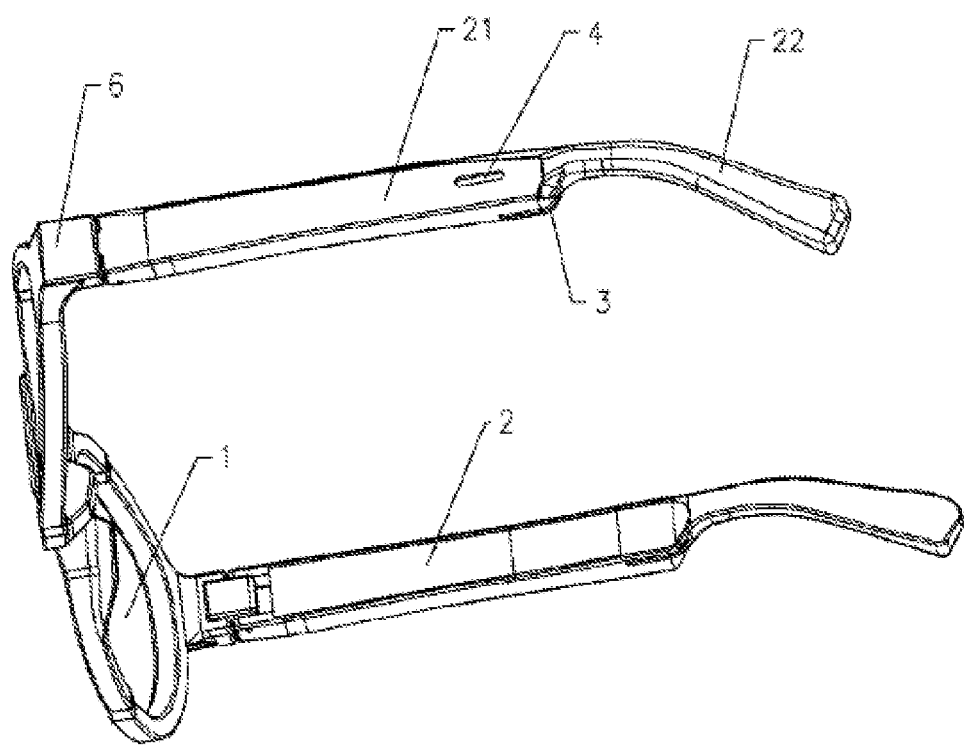
FIG. 7 is a structural schematic diagram of an intelligent head-mounted apparatus in the prior art.

Referring to FIG. 6, FIG. 6 is a comparison diagram of the frequency response curves at the position 30 cm away from the side of the wearer in this embodiment, the first embodiment and the prior art. Through comparison, it can be seen that this embodiment has a better effect on reducing the sound leakage for the people around the wearer at the far-field, which is significantly improved compared with the first embodiment and is similar to the effect of the solution of the prior art.

Specifically, the leg 2 comprises a fixed section 21 and a fitting section 22, the fixed section 21 is coupled to the lens 1, the fitting section 22 is located at an end of the fixed section 21 away from the lens 1, and the fitting section 22 is bent and extended with respect to the fixed section 21. The sound generation device is provided at the fixed section 21, and the sound outlet hole 3 is provided at a position of the fixed section 21 adjacent to the fitting section 22. In addition, based on the working state of the intelligent head-mounted apparatus, the sound outlet hole 3 is provided at the bottom surface of the fixed section 21 facing the earhole of the wearer.

The auxiliary sound leakage hole 5 is located at the top surface, the bottom surface or the side surface of the leg 2, and the main sound leakage hole 4 may be located at the top surface, the bottom surface or the side surface of the leg 2. In this specific embodiment, the main sound leakage hole 4 is located at the side surface of an end of the fitting section 22 away from the fixed section 21, and the auxiliary sound leakage hole 5 is located at the side surface of the fixed section 21.

The distance between the auxiliary sound leakage hole 5 and the earhole of the wearer is larger than the distance between the sound outlet hole 3 and the earhole of the wearer by more than 5 mm, so that the two sound sources (i.e., the sound outlet hole 3 and the auxiliary sound leakage hole 5) relative to the earhole of the wearer do not meet the condition for the formation of the acoustic dipole effect, so the influence on the wearer may be reduced.

In a further embodiment, the area of the auxiliary sound leakage hole 5 is smaller than that of the main sound leakage hole 4. For example, the opening area of the main sound leakage hole 4 is designed to be 1 mm×10 mm, and the opening area of the auxiliary sound leakage hole 5 is designed to be 1 mm×3 mm. The above design ensures that most of the sound waves in the rear sound cavity of the sound generation device are still transmitted from the main sound leakage hole 4, thereby reducing the counteraction effect of the sound waves in the rear sound cavity on the sound waves at the side of the sound outlet hole 3, and improving the loudness of the sound received by the wearer.

Although some specific embodiments of the present disclosure have been described in detail by examples, it should be understood by those skilled in the art that the above examples are for illustrative purposes only and are not intended to limit the scope of the present disclosure. It should be understood by those skilled in the art that the above embodiments may be modified without departing from the scope and spirit of the present disclosure. The scope of the present disclosure is defined by the appended claims.

What is claimed is:

1. An intelligent head-mounted apparatus, comprising:
   a lens;
   a leg coupled to the lens and provided with a cavity therein;
   a sound generation device provided in the cavity and dividing the cavity into a front sound cavity and a rear sound cavity;
   a sound outlet hole provided on the leg and in communication with the front sound cavity; and
   a main sound leakage hole and an auxiliary sound leakage hole provided on the leg and in communication with the rear sound cavity,
   wherein positions of the sound outlet hole, the main sound leakage hole and the auxiliary sound leakage hole are configured such that the sound outlet hole and the auxiliary sound leakage hole are located at a front side of an auricle of a wearer, and the main sound leakage hole is located at a rear side of the auricle of the wearer when the wearer wears the intelligent head-mounted apparatus,
   wherein a distance between the auxiliary sound leakage hole and the sound outlet hole is smaller than a distance between the main sound leakage hole and the sound outlet hole.

2. The intelligent head-mounted apparatus according to claim 1, wherein the main sound leakage hole on the leg is positioned such that a distance between the main sound leakage hole and an earhole of the wearer of the intelligent head-mounted apparatus is larger than a distance between the sound outlet hole and the earhole of the wearer.

3. The intelligent head-mounted apparatus according to claim 2, wherein the distance between the main sound leakage hole and the earhole of the wearer is larger than the distance between the sound outlet hole and the earhole of the wearer by more than 10 mm.

4. The intelligent head-mounted apparatus according to claim 1, wherein a distance between the auxiliary sound leakage hole and an earhole of the wearer is larger than a distance between the sound outlet hole and the earhole of the wearer.

5. The intelligent head-mounted apparatus according to claim 4, wherein the distance between the auxiliary sound leakage hole and the earhole of the wearer is larger than the distance between the sound outlet hole and the earhole of the wearer by more than 5 mm.

6. The intelligent head-mounted apparatus according to claim 1, wherein an area of the auxiliary sound leakage hole is smaller than that of the main sound leakage hole.

7. The intelligent head-mounted apparatus according to claim 1, wherein the sound outlet hole is located at a bottom surface of the leg, and the main sound leakage hole is located at a top surface, the bottom surface or a side surface of the leg.

8. The intelligent head-mounted apparatus according to claim 1, wherein the auxiliary sound leakage hole is located at a top surface, a bottom surface or a side surface of the leg.

9. The intelligent head-mounted apparatus according to claim 1, wherein the leg comprises a fixed section and a fitting section, the fixed section is coupled to the lens, and the fitting section is located at an end of the fixed section away from the lens and is bent and extended with respect to the fixed section, and
   wherein the sound outlet hole and the auxiliary sound leakage hole are located at the fixed section, and the main sound leakage hole is located at the fitting section.

* * * * *